United States Patent [19]

Verschuur

[11] 4,294,584

[45] Oct. 13, 1981

[54] DEWATERING OF COAL SLURRIES

[75] Inventor: Eke Verschuur, Amsterdam, Netherlands

[73] Assignee: Shell Oil Company, Houston, Tex.

[21] Appl. No.: 205,394

[22] Filed: Nov. 10, 1980

[30] Foreign Application Priority Data

Feb. 7, 1980 [NL] Netherlands ............................ 8000750

[51] Int. Cl.$^3$ ............................ C10L 5/14; C10L 5/22
[52] U.S. Cl. ............................................ 44/23; 44/2; 44/24; 209/11
[58] Field of Search ................... 44/1 A, 1 B, 1 G, 2, 44/24, 23; 209/11, 155, 169, 171, 173

[56] References Cited

U.S. PATENT DOCUMENTS

| | | | |
|---|---|---|---|
| 1,512,427 | 10/1924 | Trent | 44/24 |
| 1,589,023 | 6/1926 | Trent | 44/1 A |
| 4,057,399 | 11/1977 | Cole et al. | 44/1 B |
| 4,234,320 | 11/1980 | Verschuur | 44/23 |

*Primary Examiner*—Carl F. Dees

[57] ABSTRACT

A slurry of coal particles is dewatered by agglomerating the coal particles using a hydrocarbon binder at an elevated temperature to obtain coal pellets which are then heat treated. Gases released by the pellets during heat treatment may be heat exchanged with the slurry or burned to produce heat for the heat treatment, steam for the heat treatment, or to provide mechanical energy for the agglomeration.

10 Claims, 2 Drawing Figures

DEWATERING OF COAL SLURRIES

BACKGROUND OF THE INVENTION

This invention relates to dewatering of coal slurries, and in particular to a process and plant for the production of hardened pellets from a coal slurry.

Coal may be classified according to its size. Particles larger than, say, 25 mm are generally referred to as "lumps". Between 25 mm and, say 150 microns the particles may be referred to as "grains", and below 150 microns as "fines". The actual dividing lines are not firmly fixed; for instance, that separating the grains from the fines may lie anywhere between 75 microns and 250 microns, though more usually it is taken at 100 or 150 microns.

This specification is mainly concerned with grains and fines, since it is that these are most usually found in coal slurries, such as those used for pipeline transport. Larger lumps are difficult to transport as a slurry as they require a large energy input to keep them in suspension; fines on the other hand lend themselves to such pipeline transport, but are not easy to dewater.

One technique which is suitable for dewatering fines is agglomeration using a binder. The resulting agglomerates can then be separated mechanically from water and any non-agglomerated matter by, for example, filtration or centrifuging. Depending on the method of fabrication, the agglomerates can be made into quite hard pellets, but "green" pellets, i.e. those which have not undergone some heat treatment or curing, are weak and may break up during handling. Curing of the pellets requires a heat input which adds to the cost of the processing; it can also lead to the production of noxious odors and fumes.

U.S. Pat. No. 1,589,023 relating to a process for cracking coal and oil has some pertinence to the invention.

SUMMARY OF THE INVENTION

In accordance with the invention a process and apparatus for dewatering a slurry of coal particles and for producing strong pellets by agglomerating the coal particles using a hydrocarbon binder at an elevated temperature and heat treating the pellets, is further characterized in that the gases released by the pellets during heat treatment are utilized elsewhere in the process. All or part of the gases may be contacted with the slurry in order to remove condensable components from the gases and to transfer heat to the slurry. At least a part of the non-condensable, combustible gases may be burned to produce heat for the heat treatment, to form steam for the heat treatment or to provide mechanical energy for the agglomeration.

More specifically, the invention covers a process for agglomerating the coal particles with a hydrocarbon binder at an elevated temperature to obtain coal pellets, subjecting the pellets to heat treatment at a temperature of between 200° and 300° C., contacting the gases released by the coal pellets during the heat treatment with the slurry to remove condensable components from the gases and to transfer heat to the slurry, and burning at least a part of the non-condensable, combustible gases to produce heat for the heat treatment.

In addition, the invention covers apparatus for dewatering a slurry of coal particles and for producing strong pellets therefrom by agglomeration of the coal particles with a hydrocarbon binder at an elevated temperature comprising a slurry feed line, a pelletizer downstream of the slurry feed line, means for supplying binder to the pelletizer, mechanical dewatering means downstream of the pelletizer, heat treatment means downstream of the dewatering means, a recycle passageway for gases from the heat treatment, means to a scrubber situated in the slurry feed line upstream of the pelletizer, and means in the slurry feed line between the scrubber and the pelletizer for separating non-condensable gases from the slurry feed.

DESCRIPTION OF PREFERRED EMBODIMENTS

Figure 1:
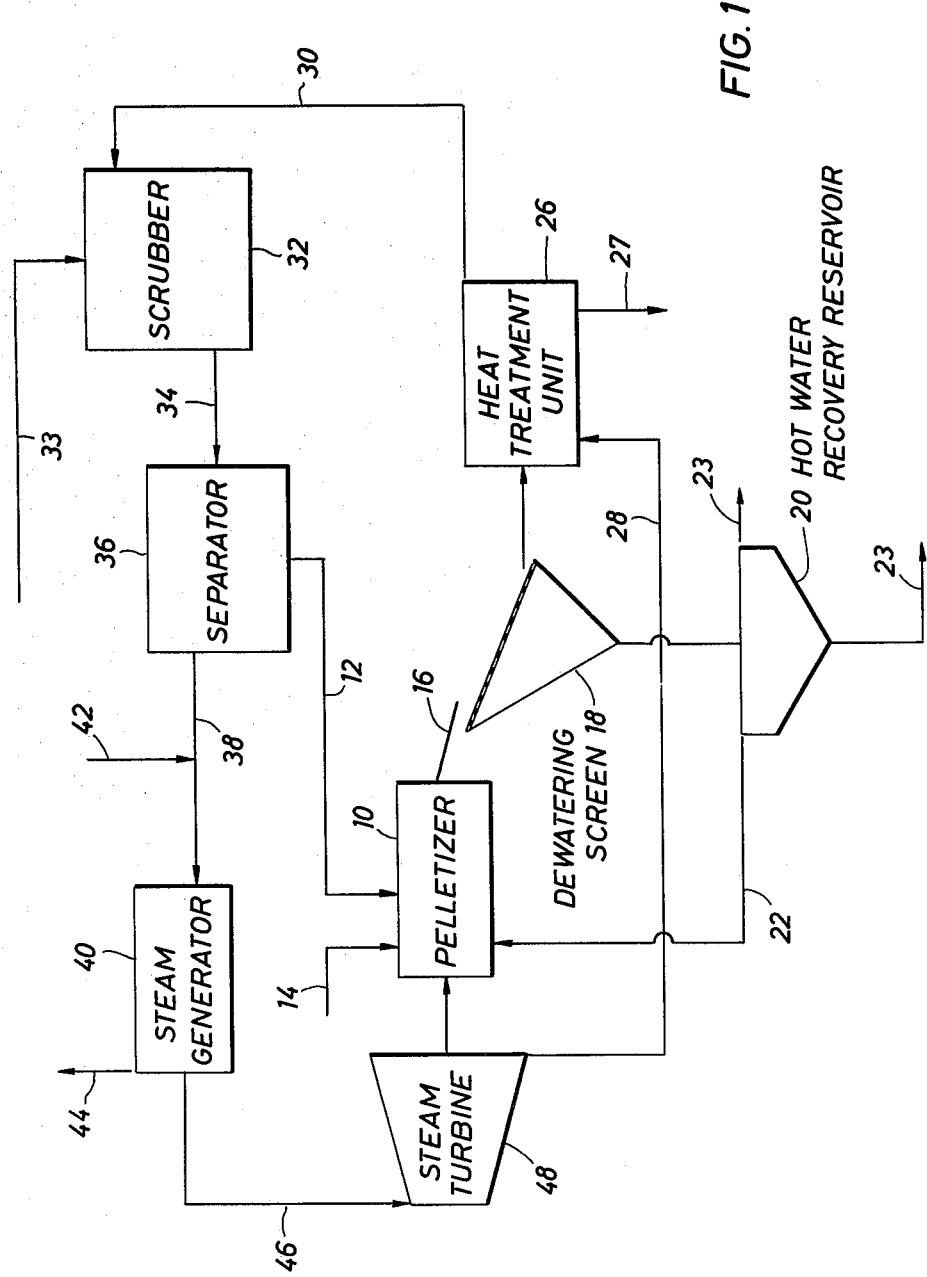
FIG. 1 is a schematic block diagram of the invention showing direct heating of coal pellets.

The process in accordance with the invention has the advantage that gases given off during heat treatment of coal particle agglomerates, which are otherwise difficult to handle due to the heavy vapors contained therein, are scrubbed effectively by the slurry. The cleaned gases may then be separated from the slurry and can be burned to provide some or all of the heat required for the heat treatment, and in some cases, depending on the type of coal, some useful extra steam or additional work - with the possibility of using the latter to drive a pelletizer used in the agglomeration stage.

The gases can advantageously be used to generate steam, which permits the direct heating of the pellets.

It is also possible to burn the gases and to use hot combustion gases therefrom to heat the pellets indirectly. In such a case, the slurry feed entering the process may be divided into two discrete streams, one of which is heated by the (cooled) combustion gases from the indirect side of the heat treatment step, and the other being heated by the vapors given off by the pellets during heat treatment. After separating the gases from the two streams they are recombined and continue to the agglomeration stage; needless to say, the two streams are not necessarily of the same size. An advantage of this arrangement is that the gas given off by the pellets is not diluted with an inert gas, e.g. the stream and will tend to have a higher calorific value.

Where the heat treatment is to be relatively severe, a controlled quantity of air may be allowed to enter the heat treatment zone and to come into contact with the pellets. Some of the coal will then burn with the air to generate the necessary heat. This practice may be particularly advantageous if smokeless fuel is to be produced.

In another embodiment the heat treatment is carried out in two or more stages; this permits closer control and eventually the combination of direct heating with indirect heating of the pellets.

The invention extends to a plant for carrying out the process in accordance with the invention.

Such a plant for preparing coal pellets from a coal slurry comprises a pelletizer with a slurry feed line and provided with means for supplying a dosed quantity of binder, and a heat treatment unit, dewatering means being provided between the pelletizer and the heat treatment unit downstream of the pelletizer, and is characterized by a passage for gases from the heat treatment unit to be recycled to a scrubber in the slurry feed line upstream of the pelletizer, and means in the line between the scrubber and the pelletizer for separating the treated gases from the coal slurry.

The plant in accordance with the invention has the advantage that it makes use of conventional equipment, albeit arranged in a novel way, to achieve a more efficient result than was formerly envisaged. Not only can a maximum of the heat be recovered from the heat treatment step but also the gases given off by the coal pellets can be recovered and used in the process in order to make it substantially "self-supporting" in energy terms.

Where the coal is particularly rich in volatile matter, there may be a net energy surplus over that required for the heat treatment step. In these circumstances, it may be used to provide some or all of the energy required to drive the pelletizer.

For direct heating of the pellets, a steam generator may be provided in which the treated gases are burned to generate the steam necessary for the heat treatment step. If by virtue of the nature of the coal more steam is available than is required for the heat treatment step, an expander, such as a steam turbine, can be interposed between the steam generator and the heat treatment unit.

With indirect heating of the coal pellets there are two gas streams from the heat treatment unit —one of hot combustion gases and the other combustable gases and vapors given off by the coal pellets. In order to recuperate the available energy with the greatest efficiency, the coal slurry feed is preferably divided into two streams, each stream passing to its own scrubber and subsequent separator. The two streams are not necessarily each of the same size. The gases from one separator are expelled to the atmosphere—being combustion gases, cleaned by their contact with the coal slurry—and the gases from the other are recovered, being the valuable non-condensable, and combustible gases given off by the coal pellets.

The invention will now be further described by way of example with reference to the accompanying drawings, in which: FIG. 1 is a schematic block diagram of a plant for carrying out a process in accordance with the invention, with indirect heating of the pellets during their heat treatment.

The plant in FIG. 1 comprises a pelletizer 10 having a coal slurry feed line 12 and means for supplying a dosed quantity of binder via line 14. Formed green pellets leave the pelletizer by line 16 and pass over a dewatering screen 18 which is arranged to separate the pellets from the water and any non-agglomerated material. The latter leave the plant via a hot water reservoir 20 whence hot water can be supplied to the pelletizer via line 22 or discharged to a cooling pond by line 23; any solids are allowed to settle and are removed from the bottom of the reservoir by line 24.

The pellets are transferred from the screen 18 to a heat treatment unit 26 in which they are subjected to an elevated temperature by the action of steam which enters by line 28. The heat treated or cured pellets leave by line 27.

During the heat treatment gases are given off by the coal pellets. These gases are removed from the unit by line 30 which leads to a scrubber 32 in the coal slurry inlet line 33. In the scrubber the gases are intimately contacted with the slurry, which contact has the double function of cleaning the gases and removing any tars and other condensable components, and of transferring heat from the hot gases to the coal slurry.

The mixture of the gases and the coal slurry leave the scrubber by line 34 leading to a separator 36 in whch the coal slurry and the gases are separated by gravity. The resulting pre-heated coal slurry leaves the separator 36 by inlet line 12 leading to the pelletizer.

The treated gases leave the separator by line 38 leading to a steam generator 40 in which they are combusted with air which enters by line 42 to generate the steam necessary for the heat treatment stage.

The combustion gases leave the steam generator by a stack 44 and superheated steam is drawn off by line 46 leading to a steam turbine 48 which drives the pelletizer. Expanded steam leaves the turbine by line 28 leading to the heat treatment unit.

The pelletizer 10 may be one of several commercially available models, which in general comprise a cylindrical vessel with an axially powered stirrer, arranged to mix a hydrocarbon binder intimately with an aqueous slurry under turbulent conditions.

Due to the affinity of the binder for the coal whose surface it wets in preference to that of ash and other mineral matter, there is in general a reduction of the ash content of the coal after pelletization. Careful selection of the binder can increase this effect.

The subsequent heat treatment step enables the binder to be chosen from a wide range of hydrocarbons. The lighter hydrocarbons, such as gas oil, have the advantage that they are highly selective for the coal over the ash and other non-combustible materials, heavier hydrocarbons, e.g. long residues and even coal tar, are cheaper and will contribute to the calorific value of the product and make stronger pellets.

The binder may be added as a liquid, either neat or in the form of an aqueous emulsion, or in the case of heavier residues in powdered form. The temperature of the slurry during agglomeration will be determined very much by the binder characteristics, but will normally be in the range of 60° to 120° C. (the water being kept in its liquid phase).

Figure 2:
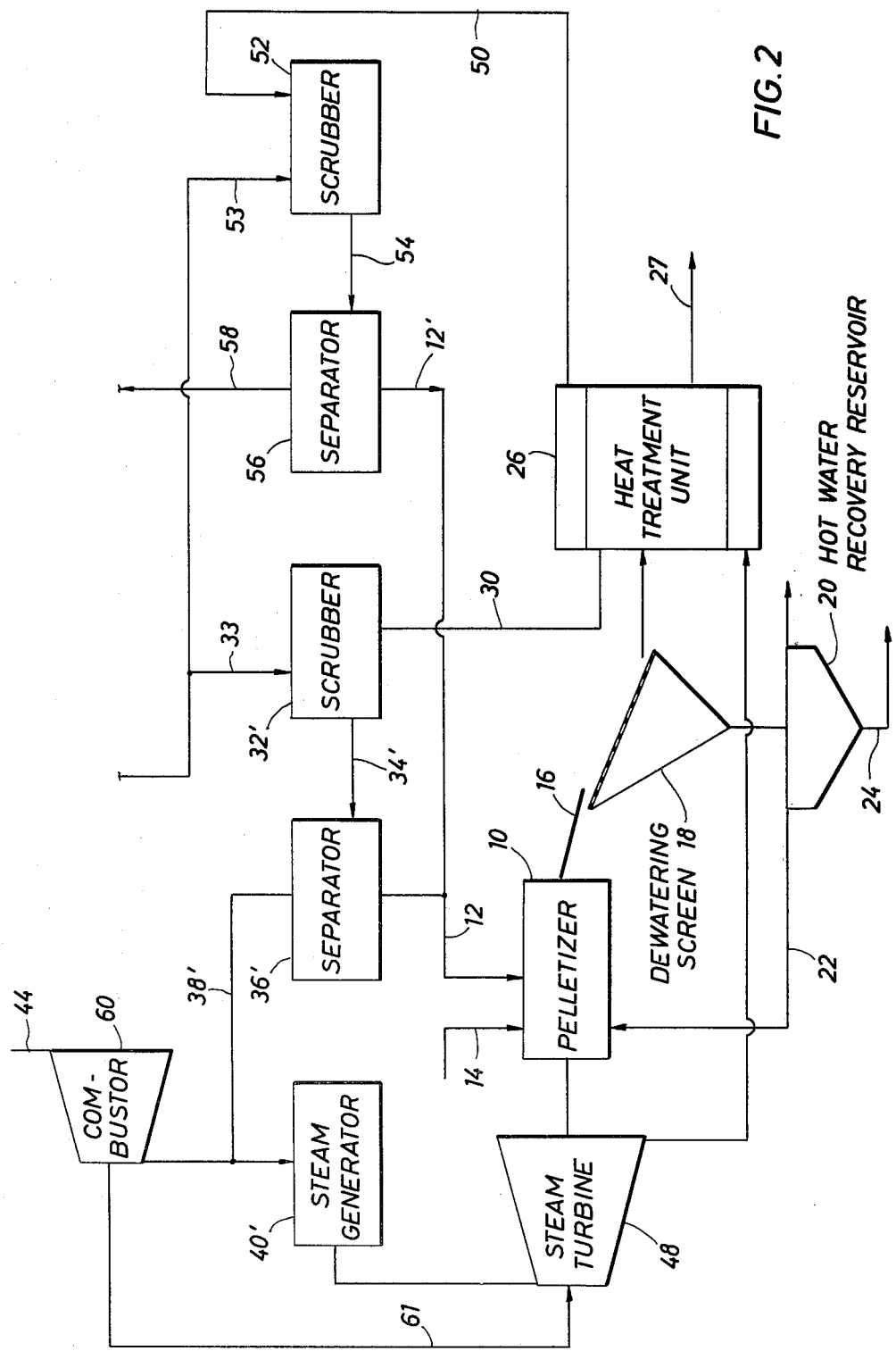
FIG. 2 is a schematic block diagram of the invention showing indirect heating of coal pellets.

The plant in FIG. 2 is similar to that in FIG. 1, and comprises a pelletizer 10 with inlets for the coal slurry feed and binder at 12 and 14 respectively, and an outlet 16 for the formed, green pellets, which, after dewatering, are transferred to the heat treatment unit 26.

As in FIG. 1 the gases given off by the pellets in the heat treatment unit are recovered and passed to a scrubber 32'. This they leave by line 34' to a separator 36'. The treated gases leave by line 38' and, after compression, are burned with air in a combustor 60. The hot combustion gases 61 are expanded in a turbine 48 whence they leave by line 28 to the heat treatment unit 26, in which they heat the pellets indirectly. Surplus power from the turbine 48 is used for air and gas compression.

The combustion gases which are used to supply the heat to the heat treatment unit are removed from the unit via line 50 leading to a second scrubber 52 in which they are brought into intimate contact with coal slurry entering via line 53. The mixture leaves the second scrubber by line 54 to a second separator 56 whence the gases are exhausted and the slurry recombined with that from the scrubber 36' to enter the pelletizer.

EXAMPLE

A pipeline slurry comprising 50% w coal particles smaller than 250 microns was heated to 80° C. and mixed for 30 min. with 21% w (based on the coal) heavy residue hydrocarbon binder in an S.P.S. pelletizer to form substantially spherical, green pellets of 3 to 5 mm in diameter.

The pellets were dewatered and transferred to a heat treatment unit where they were directly heated by means of live steam to 300° C. The resulting gases were recovered and used to pre-heat the incoming slurry which was thus raised in temperature to 90° C.

The gases were separated from the slurry and were available in sufficient quantity to raise superheated steam at 500° C. After being expanded to drive the pelletizer the steam had a temperature of approximately 300° C. and was suitable for applying the heat necessary for the heat treatment of the pellets in the heat treatment unit.

The heat treated pellets had lost approximately ⅓ of the binder after the heat treatment step.

The treated pellets were found to be particularly suitable for grinding, whereas the green pellets were impossible to grind, a glutinous paste being formed almost immediately and thus blocking the grinding mill. Moreover, the plant was substantially self sufficient in energy terms, and there was very little opportunity for noxious odors to be given off.

What is claimed is:

1. A process for dewatering a slurry of coal particles and for producing strong pellets therefrom comprising agglomerating the coal particles with a hydrocarbon binder at an elevated temperture to obtain coal pellets, subjecting the pellets to heat treatment at a temperature of between 200° and 300° C., contacting gases released by the coal pellets during the heat treatment with the slurry to remove condensable components from the gases and to transfer heat to the slurry, and burning at least a part of the non-condensable gases to product heat for the heat treatment.

2. A process as claimed in claim 1 in which at least a part of the non-condensable gases are burned to produce steam, and the steam is used to heat the pellets directly.

3. A process as claimed in claim 2 in which at least a part of the steam is expanded to supply the mechanical energy for the agglomeration.

4. A process as claimed in claim 1 in which the gases derived from the combustion of the non-condensable gases are used to heat the pellets indirectly.

5. A process as claimed in claim 4 in which the coal slurry is divided into two streams, one of which is used to contact the combustible gases released by the coal pellets during heat treatment, and the other of which is used to contact the combustion gases derived from the combustion of the non-condensable gases.

6. Apparatus for dewatering a slurry of coal particles and for producing strong pellets therefrom by agglomeration of the coal particles with a hydrocarbon binder at an elevated temperature comprising a slurry feed line, a pelletizer downstream of the slurry feed line, means for supplying binder to the pelletizer, mechanical dewatering means downstream of the pelletizer, heat treatment means downstream of the dewatering means, a recycle passageway for condensable and non-condensable gases from the heat treatment means to a scrubber situated in the slurry feed line upstream of the pelletizer, and means in the slurry feed line between the scrubber and the pelletizer for separating non-condensable gases from the slurry feed.

7. Apparatus as claimed in claim 6 in which combustor means is provided for combustion of the non-condensable gases, and a steam generator is arranged to receive the heat of combustion to produce steam for the heat treatment means.

8. Apparatus as claimed in claim 7 in which a steam turbine is provided to drive the pelletizer and a passageway is provided for supplying steam from the steam generator to the steam turbine.

9. Apparatus as claimed in claim 6 in which combustor means is provided for the combustion of the non-condensable gases, and a gas turbine is arranged to receive the hot gases from the combustor to drive the pelletizer.

10. Apparatus as claimed in claims 7 or 9 in which the slurry feed line is divided into two streams, each provided with a scrubber and a separator, one stream being arranged for contacting the combustible gases released by the coal pellets during heat treatment and the other for contacting the gases derived from the combustion of the non-condensable gases.

* * * * *